W. G. HAAS.
METHOD OF PNEUMATIC CONTROL OF VARIOUS MECHANISMS.
APPLICATION FILED FEB. 10, 1917.
1,291,488.
Patented Jan. 14, 1919.
6 SHEETS—SHEET 2.
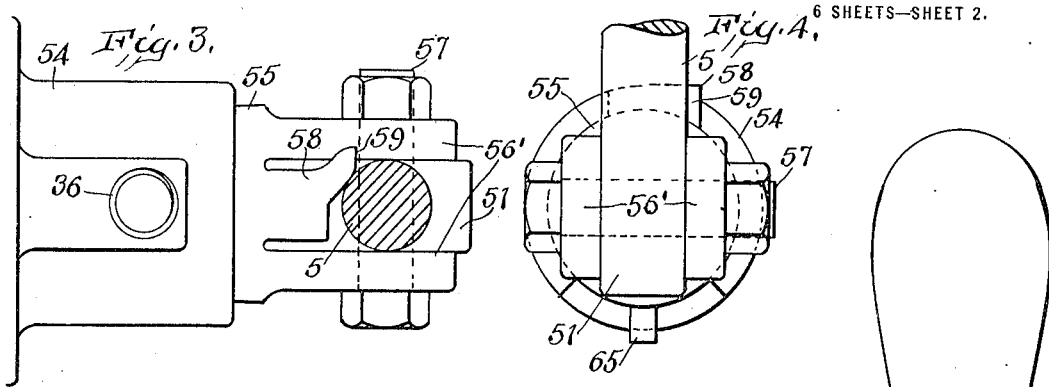
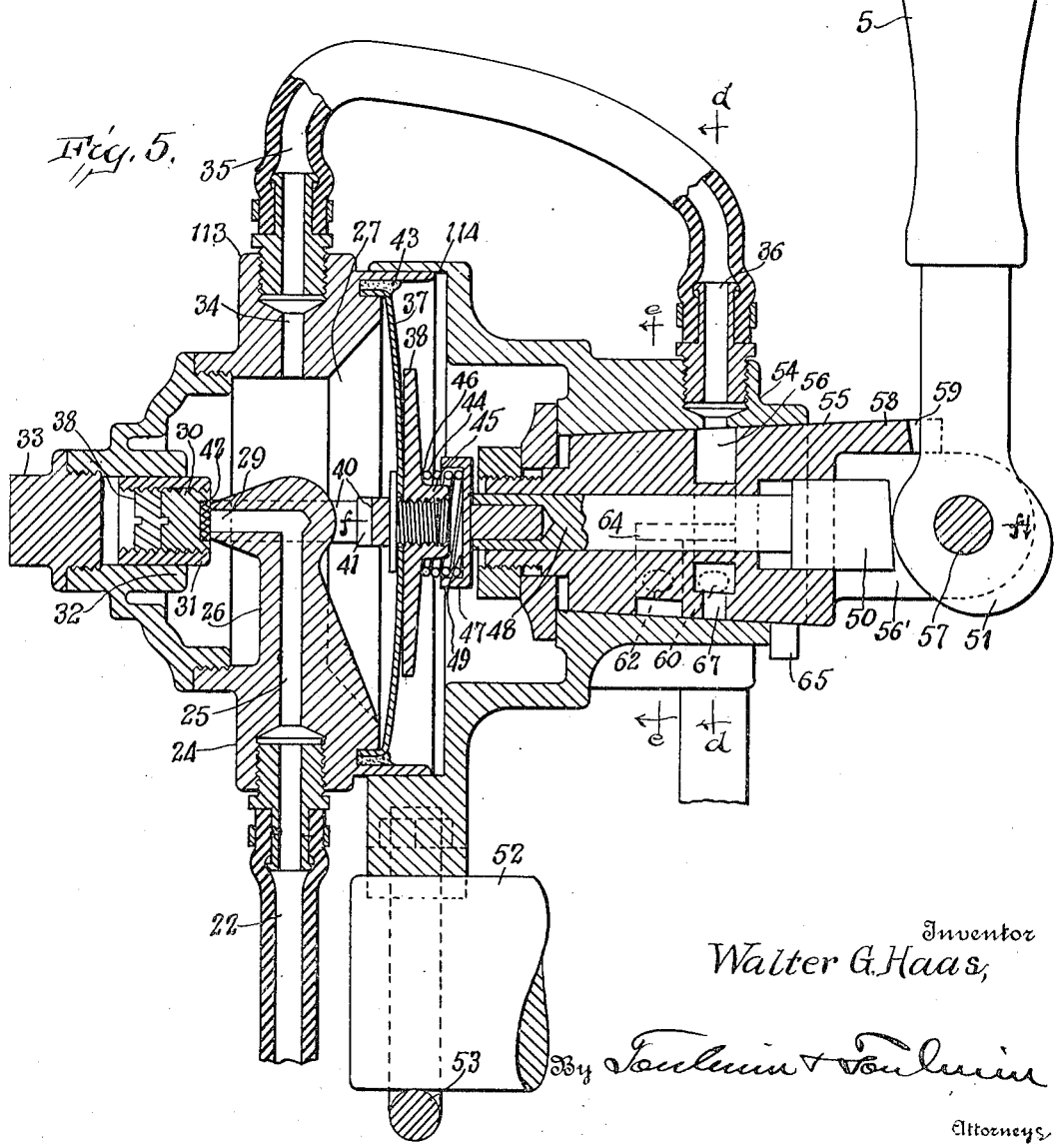
Inventor
Walter G. Haas,
By Toulmin & Toulmin
Attorneys

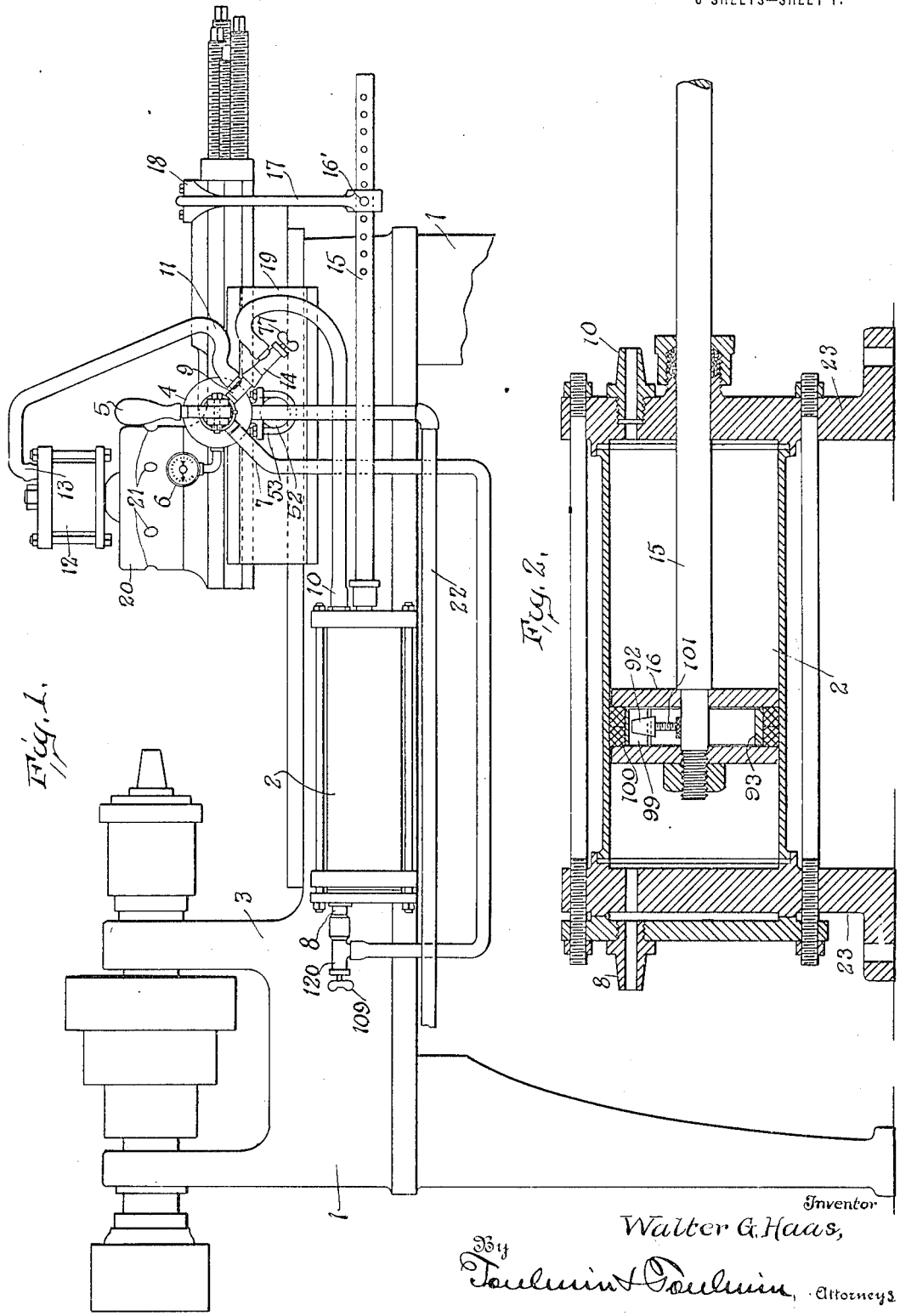

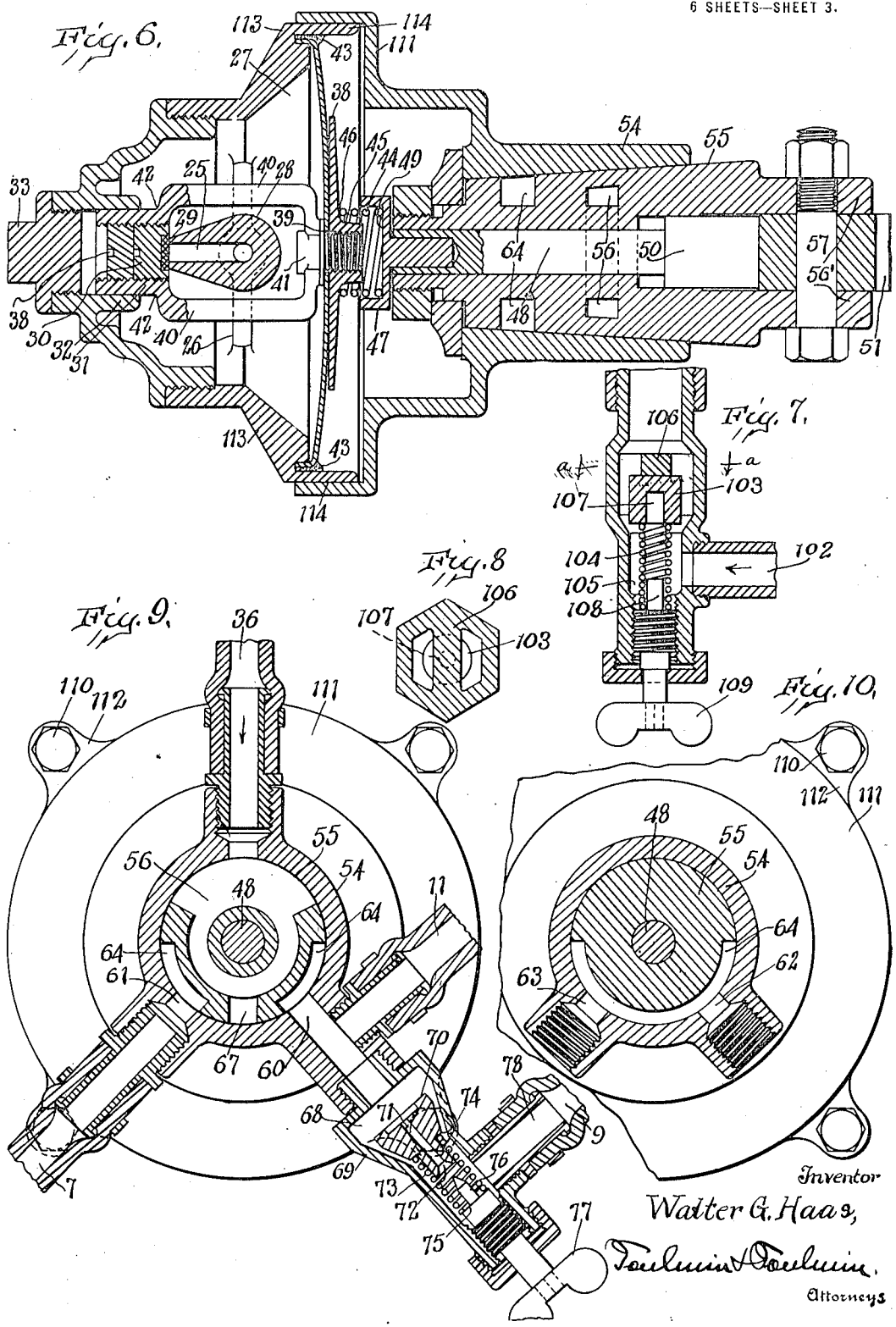

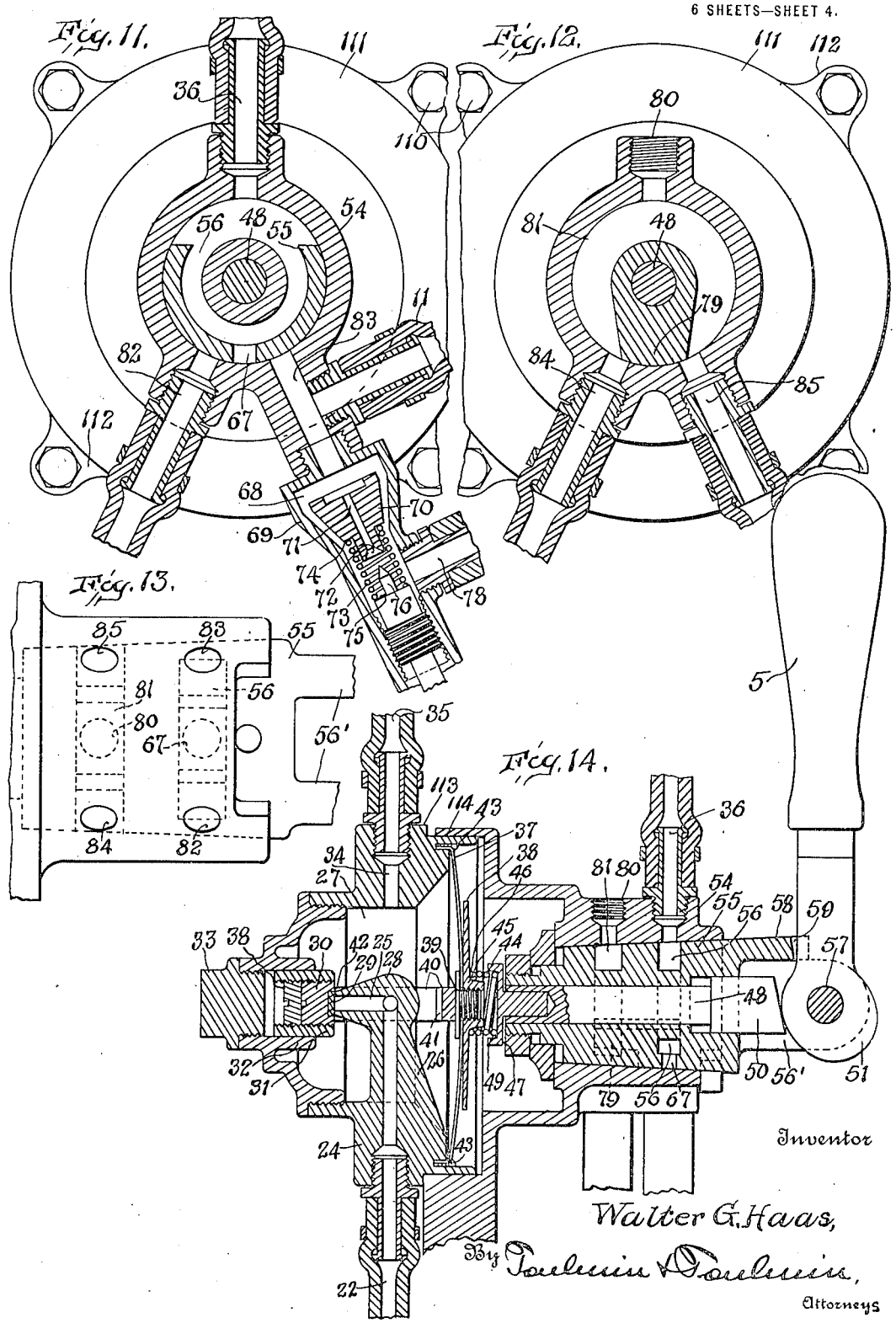

W. G. HAAS.
METHOD OF PNEUMATIC CONTROL OF VARIOUS MECHANISMS.
APPLICATION FILED FEB. 10, 1917.
1,291,488.
Patented Jan. 14, 1919.
6 SHEETS—SHEET 5.
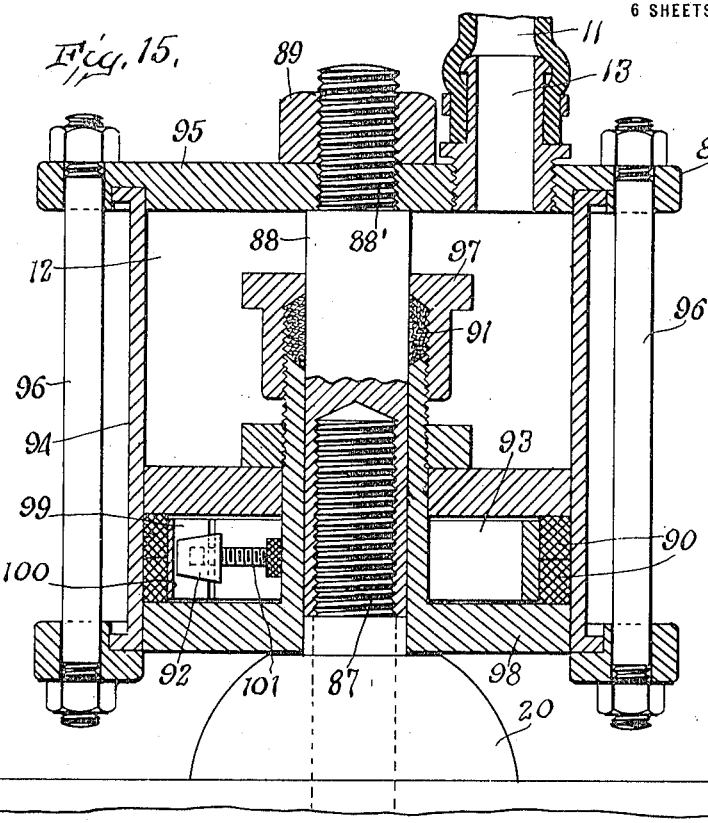
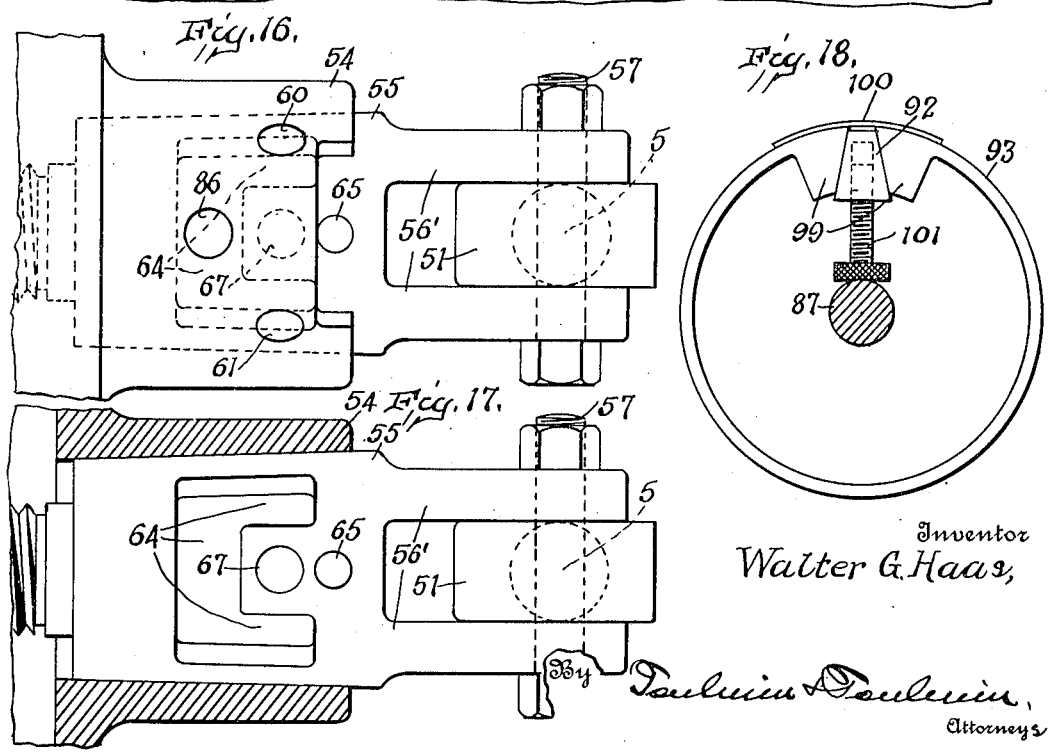
Inventor
Walter G. Haas,
By
Attorneys

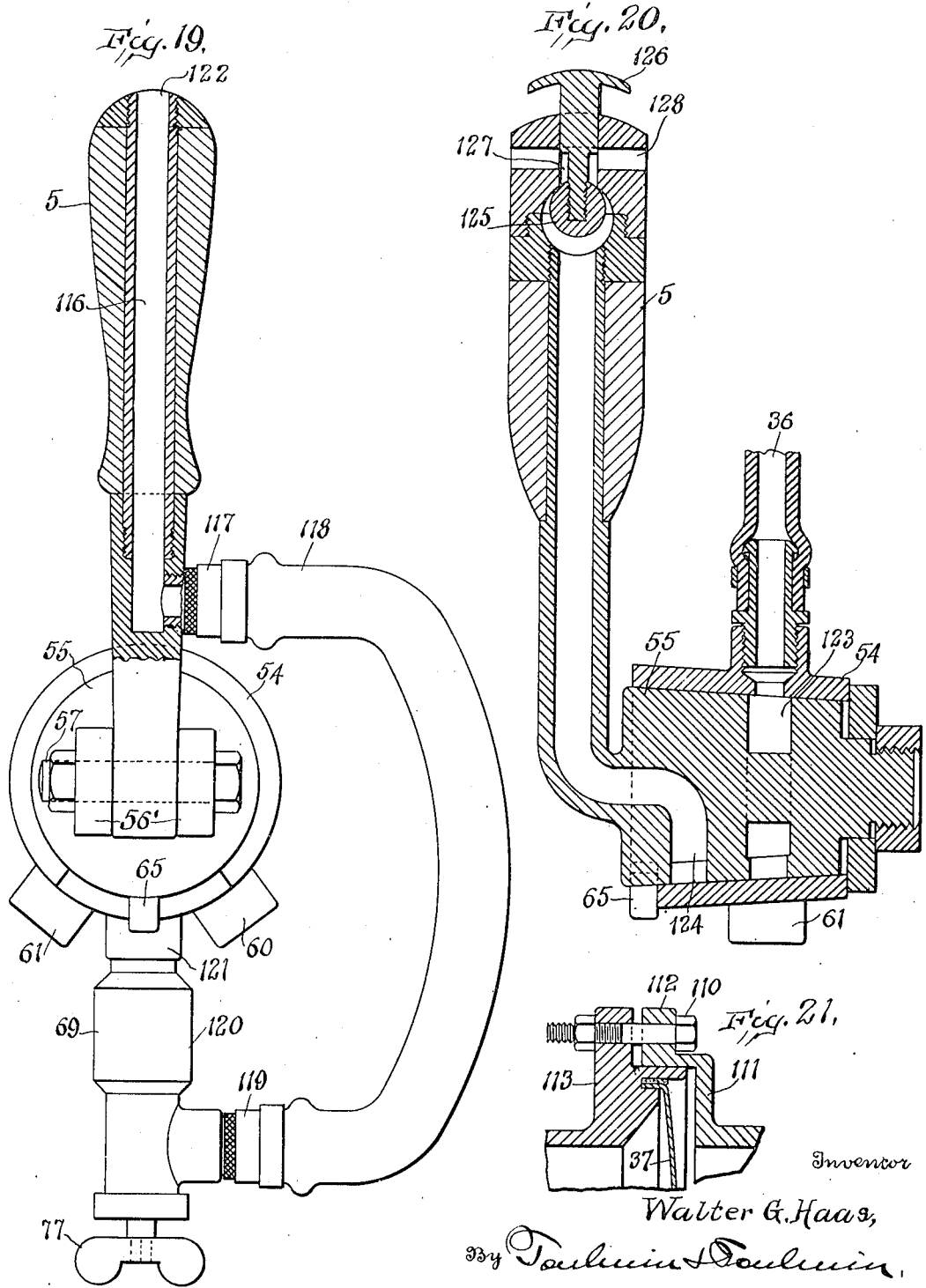

UNITED STATES PATENT OFFICE.

WALTER G. HAAS, OF DAYTON, OHIO, ASSIGNOR TO THE MIDDLETOWN MACHINE COMPANY, OF MIDDLETOWN, OHIO, A CORPORATION OF OHIO.

METHOD OF PNEUMATIC CONTROL OF VARIOUS MECHANISMS.

1,291,488.            Specification of Letters Patent.        Patented Jan. 14, 1919.

Original application filed August 24, 1916, Serial No. 116,644. Divided and this application filed February 10, 1917. Serial No. 147,753.

*To all whom it may concern:*

Be it known that I, WALTER G. HAAS, a citizen of the United States, residing at Dayton, in the county of Montgomery and State of Ohio, have invented certain new and useful Improvements in Methods of Pneumatic Control of Various Mechanisms, of which the following is a specification, reference being had therein to the accompanying drawing.

My invention relates to an apparatus for and method of pneumatic control of various mechanisms.

In the embodiment illustrated and described herein this pneumatic control is applied to a particular machine tool. I do not limit myself to such application as this control may be applied to many machines in numerous arts, as for instance in brakes, hoisting machines, etc.

My object is to provide a pneumatic control which will operate a machine element, as for instance, a carriage on a lathe, in a forward or rearward direction and to simultaneously with the movement in one direction operate other mechanism as for instance locking the tool turret on the carriage as it progresses into operative position.

In particular my object is to provide an apparatus or a method of pneumatic control through a mechanism which may be controlled by a single device, by one movement of which both an inlet of air and the exhaust of air would be accomplished for operation of one portion of the mechanism and a locking or unlocking of another portion of the mechanism would be secured simultaneously.

It is my object to provide conduits which may be used for both the inlet and the exhaust of the air to operate any portion of the mechanism, the inlet and exhaust or the exhaust and inlet taking place in succession, thereby using the same conduit for air traveling in either direction; and to provide means for maintaining the air at any desired pressure.

The present invention relates to the method of delivering air under pressure to the machine tool or apparatus; in directing such air from the supply in a predetermined direction, in applying the same to moving parts to advance or retreat the carriage of such machine or apparatus.

A further step of the method to be usually employed, is that of reducing the pressure applied to the moving parts as compared with the pressure in the supply, whereby a more perfect and controlled manipulation of the carriage is obtained.

Another branch of my method consists in utilizing air under pressure to actuate a lock by which to unite the tool turret to the carriage and hold the tool in working position, and in releasing the air from the lock to unlock the turret and carriage and permit the turret to partially revolve to present a new tool to the work.

In practice all the steps of both branches of this method of pneumatic lathe operating and controlling carriages and chucks will generally be utilized, but the method as it affects the operation of the carriage may be utilized with and without the second branch of the method which goes to the locking and unlocking of the tool turret.

The use of the term "machine tool" is simply for the purposes of convenience and I do not wish to be understood as limiting myself in any particular to any one machine, as my invention is susceptible of the widest application.

The present application is a division of the application filed by me Aug. 24th, 1916, Ser. No. 116,644.

In the accompanying drawings, Figure 1 illustrates a side elevation of a machine tool with my invention mounted thereon; Fig. 2 is a longitudinal vertical section of the motor; Fig. 3 is a bottom plan view of a detail of the connection of the control handle on the controller; Fig. 4 is an end view of the controller handle for the controller; Fig. 5 is a vertical longitudinal section of the controller and regulator; Fig. 6 is a horizontal longitudinal section of the controller and regulator; Fig. 7 is a vertical section of the valve for checking the advance of a tool at an abnormal rate; Fig. 8 is a horizontal section on the line *a—a* of Fig. 7; Fig. 9 is a vertical transverse section on the line *d—d* of Fig. 5; Fig. 10 is a vertical transverse section on the line *e—e* of Fig. 5; Figs. 11 to 14 show a modified form and in these figures, Fig. 11 is a transverse vertical section on the line *a—a* of Fig. 14; Fig. 12 is a vertical transverse section on the line *b—b* of Fig. 14; Fig. 13 is a bottom plan view illustrating the location and arrangement of ports in the controller illustrated by Fig. 14; Fig. 14 is a vertical longitudinal section of the controller and regulator; Fig. 15 is a vertical section of the pneumatic lock on the tool turret; Fig. 16 is a bottom plan view of the arrangement of ports in the controller; Fig. 17 is a similar view showing the location of the supply port and connecting passages in the controller; Fig. 18 is a top plan view of the packing ring; Fig. 19 is a front elevation of the controller, the handle of which is in vertical section at right angles to the line of vision of the observer; Fig. 20 is a vertical section on the longitudinal axis $f$—$f$ of the controller, in Fig. 5; and Fig. 21 is a detail sectional view on the line $g$—$g$ of Fig. 11 showing the means to have a certain set low pressure as a base to increase from if so desired.

Assembly. (Fig. 1)

1 designates generally a machine tool to which my invention has been applied as illustrated in Fig. 1. 2 designates the motor attached to the lathe bed 3; 4 indicates the controller; 5 the controller handle; 6 the gage on the regulator indicating to the operator the amount of air pressure being used for each operation. 7 indicates the air conduit leading from the controller conveying air to the forward end of the cylinder 2 and entering the cylinder at 8. 9 indicates the conduit conveying air to the rear end of the cylinder 2, entering the cylinder at 10. 11 indicates the air conduit conveying air to the pneumatic lock 12 entering it at 13. 14 indicates the valve placed in the conduit or air line 9 for regulating the flow of the air in that conduit.

15 designates the piston rod connected to the piston 16 within the cylinder 2; this piston rod is connected at 16′ to an arm 17 which is in turn connected at 18 to the carriage 19 upon which is mounted the tool turret 20 with its accompanying pneumatic lock 12. 21 indicates the portion of the tool turret in which the tools are inserted. 22 designates the conduit conveying the air from the source of supply to the regulator and controller.

(Fig. 2) In Fig. 2, 10 designates the point of communication of the conduit 9 with the rear end of the cylinder 2, 15 the piston rod and 16 the piston, while 8 designates the point of communication of the air conduit 7 with the forward end of the cylinder. 23 designates the brackets which attach the cylinder to the machine tool or lathe bed 3.

Regulator. (Figs. 5, 6 and 14).

Fig. 14 shows a modification of Fig. 5 but most of the parts are the same. In Fig. 5 22 is the conduit from the source of supply of air which is attached to the bottom of the regulator casing 24. The air is conveyed through the inlet orifice 25. This air passage is drilled through a standard 26 projecting into the interior of the pressure chamber 27. The standard terminates in a cone shaped head at right angles to its main body, designated as 28, and the orifice 25 is at the tip of the cone 28. This orifice is closed by a rubber or other resilient medium in the shape of a plug 29 carried by a plunger 30 in a shell 31. This plunger and shell travel in a guideway 32 located in one wall of the pressure chamber 27. When this plunger, shell and plug are advanced so that the rubber plug seals the orifice 25 the supply of air is cut off from the pressure chamber 27. The retreat of this plug, plunger and shell opens the orifice for the admission of air through the orifice 25 from the supply conduit 22. 33 is a screw plug in the wall of the pressure chamber 27 which may be removed for the adjustment of the plug 38, the plunger 30 and the accompanying mechanism or for the renewal of the rubber seal 29.

34 designates the exit port in the regulator. The air flows out of the port 34 in the direction of the arrow through the conduit 35 to the supply port 36 of the controller. 37 is a diaphragm secured in one wall of the pressure chamber. 38 is a reinforcing plate to which the diaphragm is secured at 39. 40 indicates a pair of fingers connected at 41 with the diaphragm and spanning the standard 26 containing the inlet port and reuniting at 42—42 (Fig. 6) by juncture with the shell 31 which carries the rubber sealing plug 29 and the screw plug 30. 43 is a sealing medium by which the diaphragm is attached to the wall of the pressure chamber. 44 is a helical spring surrounding the extension 45 of the plate 38, and normally pressing against the plate 38 at a point 46 at one end and at the other end pressing against the cup-shaped end 47 of a plunger 48 at the point 49. The plunger 48 has an enlarged beveled head 50. The surface of the beveled head 50 is in contact with the cam surface 51 carried on the end of the handle 5.

52 indicates an arm extending out from the bed of the machine tool to which the controller and regulator are attached by a strap 53.

In operation the movement of the handle 5 to the right, Figs. 5, 6 and 14 will cause the cam surface 51 to bear upon the head 50 of the plunger 48 which in turn compresses the helical spring 44, thereby exerting a pressure upon the plate 38 and the attached diaphragm 37, tending to straighten the angle of curvature of the diaphragm 37 and at the same time carry with it in a left hand direction the members 40—40, the shell 31, the plunger 30 and the rubber sealing plug 29 opening the inlet orifice 25 and allowing the air to flow into the pressure chamber 27 and thence out the outlet orifice 34. Upon the movement of the handle to the desired point a certain pressure will be exerted upon the helical spring 44 and the diaphragm 37 will be affected to the extent desired, thereby opening through its attached mechanism the orifice 25 and allowing air to enter the pressure chamber. When the quantity of air entering the chamber becomes greater than the force exerted upon the helical spring 44 which has been compressed to a desired amount through the handle 5 and the plunger 48, then the increased pressure will overcome the tension of the helical spring 44, will move the diaphragm 37 against the spring 44 and seal the orifice 25 as the sealing mechanism 29, 30 and 31, 42, 40 and 41 is attached to the diaphragm 37. As soon as the air within the pressure chamber has made its exit and reduced the pressure below the tension or pressure on the helical spring due to its setting, then the helical spring will overcome the pressure within the pressure chamber and advance to the left hand once more the diaphragm 37 opening the orifice again and allowing air to enter the second time. This fluctuation of the diaphragm 37 continues with the alternate expansion and compression of the helical spring 44 and the alternate opening and closing of the inlet orifice or port 25, thereby maintaining a uniform pressure within the pressure chamber at any desired point which is determined by the setting of the plunger 48 and the accompanying mechanism.

Having now provided for the regulation of the pressure and quantity of the air to be delivered to the controller through the port 36, I will now proceed to describe the apparatus composing the controller and its method of operation by specific designation of the various parts composing the controller.

*Controller.* (Fig. 5).

In the form of controller shown in Fig. 5 I have provided a casing 54, a supply port 36, a plug 55 in which a channel 56 has been cut to provide a passageway for the incoming air so that it will have access to the proper exit port. The plunger 48 is centrally located within the plug 55 and slides therein. The plug 55 is provided with arms 56' which embrace the lower end of the handle 5 and carry it on its bearings 57. The upper portion of the plug 55 is extended into a finger 58, the outer end of which is tapered to form a cam surface against which the handle 5 bears when it is moved to the right hand of the operator as he stands in front of the machine tool with his face to it to operate the mechanism. 59 designates this cam surface on the finger 58. 60 indicates one of the ports in the shell 54 which is utilized for both the inlet of air and the exit of air. This port is in communication with the conduit 9 which in turn leads to the rear end of the cylinder 2 and also connects with the pneumatic lock 12 of the tool turret 20.

Fig. 9 shows the location of this port 60 and also shows the location of the port 61 which communicates with the conduit 7 which in turn leads to the forward end of the cylinder 2. 61 is not shown, necessarily, in Fig. 5.

62 in Fig. 5 designates an exhaust port with which 60 is in communication when it is acting as inlet port.

In Fig. 10 the exhaust port 62 is shown as is also another exhaust port 63 which at another time is in communication with the port 61 when 61 is acting as an inlet port. I may use only one exhaust port and do not mean to confine myself in this particular as it is within the scope of my invention and the question of having one port for exhaust or more than one is a matter of convenience. 64 indicates the channel or passageway for the air to pass from 60 to 62 or from 61 to 63 or from 61 to 63 and 62. The method of conveying the air to these passageways will be more fully explained when the description of Figs. 13, 16 and 17 are reached. 65 (Figs. 4, 14, 16, 17, 19 and 20) indicates a finger attached to the plug 55 to limit its movement from side to side, from right to left, or left to right.

In Fig. 14 a modification of Fig. 5 is shown in that the exhaust is located at the top of the casing 54 instead of at the bottom, as in Fig. 5. This point of exit is designated at 80. The exhaust may be either in the shape of a single or double port.

Referring again to Fig. 9 which is a vertical transverse section of Fig. 5 on the line *d—d*, 36 designates the supply port, 56 the channel in the plug 55 through which the air is conveyed to either 61 or 60. The position of the plug is such in Fig. 9 that no air can be delivered in either 61 or 60. The apparatus is dead when placed at this point and the control handle will be vertical. If the handle 5 is moved to the right hand of the operator the plug 55 will be shifted so that the channel 56 and its port 67 will register with the port 61, thereby allowing the air to flow from the source of supply through the regulator into the controller, through 36, down 56, through 67 out 61 into the conduit 7 and thence to the front of the cylinder which will force back the piston 16, move the piston rod 15 and thereby retreat the carriage 19.

If the handle 5 is moved to the left hand then the plug 55 will be revolved in the opposite direction until the port 67 coincides with the port 60 and the air is permitted to flow through the conduits 11 and 9 through a pneumatic lock of the tool turret and the rear end of the cylinder, respectively. The carriage will then move forward and the tool turret will be locked and its tool mounted in it at 21 will also be locked in position to operate upon the work in hand carried by the head stock of a lathe.

When air flows out through 60, through the conduit 9 it passes into the valve casing or conduit 68 which is tapered at 69 to form a seat for the valve piston 70 which is also of tapered or conical form of the same angle of taper as the seat 69. Through the center of this valve piston 70 is a passageway 71. The piston 70 has an extended throat 72 surrounding which is a helical spring 73 which abuts against a shoulder 74 on the valve piston 70 at one end and at the other end of the spring abuts against a seat 75 located in the plunger. A needle 76 is adapted to engage the orifice of the passage 71 in order to provide both a guide for the valve piston and a seal for the orifice. When the valve piston is seated the butterfly handle 77 is used to adjust the various parts of the valve connected therewith or which come in contact with the needle and the shoulder surrounding the needle. 78 indicates the port to which the conduit 9 is attached.

Fig. 10 is a vertical transverse section on the line e—e of Fig. 5. 54 is the shell, 55 is the plug. 48 is the plunger shaft journaled therein. 64 is the channel or passageway for communication with an inlet port and connecting the inlet port to an exhaust port like 62 or 63.

In Fig. 11 a similar construction to Fig. 5 is shown save that ports 82 and 83 are both exit ports.

In Fig. 12 ports 84 and 85 are both inlet ports, one of which is sealed by the moving finger 79 of the plug 55 so that the air would pass out of either 84 or 85, whichever one happened to be opened, and thence through the channel 81 out through the port 80 to the atmosphere. This modified form is shown in Fig. 14. The distinction between the construction shown in Figs. 5, 6, 9 and 10 and the construction shown in Figs. 11, 12 and 14 is that in the first mentioned construction an inlet port was also an outlet or exit port, while in the second construction separate conduits were used for inlet and separate conduits for exit. Fig. 13 shows the location of ports and channels in the modified form.

*Tool turret lock.* (Fig. 15).

13 indicates the point of attachment of the air conduit to the cylinder 86 of the pneumatic lock 12. 98 is the piston traveling in the cylinder 86 up and down the spindle 87 and its attached parts 88 and 89 consisting of an added length of spindle screwed onto the first-mentioned spindle 87, the second mentioned spindle being 88. The cylinder 86 rests upon a shoulder 88' on the extended spindle 88 and is locked thereto by the nut 89. 90 designates the packing rings on the piston. 91 designates the packing around the piston where it comes in contact with the spindle. 92 is a wedge-shaped head of the expander to expand the packing ring 93. The wall of the cylinder 94 has the top or head of the cylinder 95 clamped to it by the bolts 96. 97 indicates a collar which retains the packing 91.

In operation air is admitted through the conduit 11 and the port 13 into the cylinder 86 which forces the piston 98 into engagement with the turret 20 and locks the spindle 87 which is fixed to the carriage and to the turret 20, thereby locking the turret and carriage together. Upon the release of the air from the cylinder the connection or lock between the piston head and the turret is free so that the turret can turn when it is automatically tripped upon the return of the carriage to its rearward position. Upon return of the carriage a new tool is brought into position.

Fig. 18 illustrates the packing ring 93, a wedge-shaped plug 92 to expand the severed packing ring. This wedge-shaped plug 92 engages with the lug 99—99. The shield 100 overlaps the breech in the split ring 93. The plug 92 is advanced or retreated by the screw 101.

Fig. 13 is a bottom plan view showing in dotted lines the location of the ports and passageways of the modified form, illustrated in Figs. 11, 12 and 14.

Fig. 16 is a bottom plan view showing in dotted lines the location of the ports and passageways of the preferred form shown in Figs. 5, 6, 9 and 10. A single exhaust port 86 is shown.

Fig. 17 is a bottom plan view of the controller plug 55 with the casing 54 in section. It shows the location of the orifice 67 and the passageways 64.

Fig. 7 shows the buffer valve or the valve to prevent a rapid exit of air out of the front of the cylinder 2 through the conduit 7. This valve is located in the conduit 7 at 8. When the air is flowing through the orifice 102 from the conduit 7 and thence into the cylinder 2 to push back the piston, the air flowing in the direction indicated by the arrow, the passage of the air is not disturbed by the valve in the conduit 7. When the air is passing through the valve in the other direction by reason of the fact that the air ahead of the piston is being forced out of the cylinder as the tool progresses in the work and the tool carriage advances, then the air will affect the valve slightly, but the valve piston 103 is very slightly affected because the normal pressure during the exit of the air is not great enough to compress the resilient means in the shape of a helical spring 104 which holds the valve piston 103 in normal position. When, however, the tool is driven through the work and suddenly starts forward, the air will rush out of the forward end of the cylinder and through the conduit 7. This abnormal rush of air will drive the piston 103 toward its seat 105 and compress the spring 104, thus cutting off the rapid exit of air, and the forward movement of the tool. The air in front of this piston head serves as a pneumatic buffer and prevents the tool from racing forward and striking the head stock with consequent injury to the mechanism. The fit between the piston 103 and the seat 105 is a loose, running fit, so that some air can seep past the piston and gradually escape. The bridge 106 is normally in engagement with the piston 103. The piston is a cylinder with an internal angular recess 107 cut in it which is adapted to engage with the pin 108 serving as a guide to perfectly seat the piston when the helical spring 104 is compressed. The tension of the spring can be adjusted by the set screw 109.

Referring to Fig. 8 which is a section of 7 on the line a—a, it will be observed that the valve piston 103 is guided by the portions of the bridge 106 which extend downward on each side of the piston 103 and embrace 103 a portion of its circumference. This feature insures the perfect alinement of 103 relative to the rest of the valve and its free and rapid movement to take care of the exigencies of its work.

It has been found necessary at times to adjust the angle of curvature of the diaphragm in the regulator and thereby regulate the pressure necessary to operate the diaphragm. In order to so change the curvature of this diaphragm, nuts and bolts 110, arranged about the periphery of the casing 111, are provided which connect with lugs 112 on 111 with similar lugs on the regulator casing 113. 113 may be adjusted in relation to 111 by the loosening or tightening of these nuts and bolts 110 and the angle of curvature of the diaphragm will be accordingly determined, as will be readily observed by examining Fig. 21. The sliding fit of the two parts 113 and 111 can be observed in Figs. 5, 6 and 14 at the points 114.

In Fig. 19 I have illustrated a front elevation of the controller showing the special method of exhaust and its control.

5 indicates the handle which in this case has a passageway 116 extending throughout its length which is connected at 117 to a flexible conduit 118 which in turn is coupled at 119 to the pneumatic buffer or check valve illustrated in detail in Figs. 7 and 8 and designated in this figure as 120 in its entirety. 60 and 61 indicate respectively the connections with the right and left hand ends of the cylinder or motor 2.

This form of controller and exhaust may be either used with the regulator or without it. The regulator will maintain the pressure at any desired point according to the way the handle is set in an inward or outward direction. No regulator is used on some classes of work, as for instance when using a positive turret or when applied to a drill press. When the regulator is eliminated there is provided a constant pressure of a known number of pounds per square inch from a suitable source of supply.

121 indicates the port of exhaust which is a single port in this instance. In this form of my controller when the handle is either turned to the right or left and the machine is in operation the exhaust is constantly going on through 121, 120, 119, 118, 117 and out through 116. To stop the exhaust the operator puts his thumb over the orifice 122 and restricts the amount of exhaust at his pleasure, thereby holding the air which would normally pass out the exhaust behind the piston in the cylinder acting as a buffer or check on the rapidity of movement of the piston. This facilitates a very delicate control of the mechanism and its adaptation to many kinds of the finest work requiring minute adjustment, varying speeds and varying fluctuations of power. If the exhaust is completely shut off by the thumb, of course, the carriage will cease its movement altogether.

In Fig. 20 is illustrated a vertical longitudinal section of the controller without a regulator. 36 indicates the conduit from the source of supply of air, 54 the casing and 55 the valve plug. 61 indicates the exit or inlet port which communicates with the left hand end of the cylinder 2. By reason of the section the port 60 communicating with the right hand in the cylinder is not shown. The air is admitted through 36 into the passageway 123 and thence out the port 60 if desired, while at the same time the air from the forward end of the cylinder will exhaust through 61 into the passageway 124 which leads out through the handle 5 normally closed by the pressure of the exhaust by the valve 125. This valve 125 may be opened by operation of the plunger 126 which will open the orifice 127 upon the pressure of the thumb of the operator upon 126. The air will escape through the passageways 128, 128 which may be of any number desired, either single, dual, triple, or quadruple, etc. In the form illustrated in Fig. 20 the exhaust is normally closed rather than normally open as in Fig. 19. In order to open the exhaust and allow the carriage to move when the handle has been moved to either right or left it will be necessary to depress the plunger 126, releasing the air from behind the piston. The same adjustment can be secured by this method as in Fig. 19. This is a very useful controller on such machines as a drill press among others where a uniform and fixed, predetermined pressure of air from the supply is suitable and a variety of pressures is not required.

*Method of operation.*

It may be assumed that the work is placed on the work spindle, that one or more tools is placed in the turret and that the turret is ready to be advanced to operate on the work.

To advance the turret the operator grasps the handle 5 and moves it toward the left. This carries the plug 55 from the position of Fig. 9 to a position such that the opening 67 is directly over the exit 60. Thereupon air under pressure may pass from pipe 36 through plug 55 and out through exit 60. Fig. 9 shows two passages 77 passing to the lock 12 and 78 leading to the cylinder 2. Air passing through the passage 78 will abut the right hand side of the pison 16 in Fig. 2, thereby forcing this piston toward the left and thus carrying the turret toward operative position. At the same time air passing through air passage 77 will enter the lock 12 as seen in Fig. 15, forcing the lock to locking position and thus preventing accidental rotation of the turret 20.

If the handle 5 is moved to the left as just stated without being oscillated around its center pin 57 only a slow movement of the turret will be given, but if a faster movement is desired the handle 5 is pulled more or less toward the right in Fig. 5 at the same time that it is given the movement to the left just mentioned. The first of these movements through the diaphragm 37 opens the orifice 25 and permits air to enter from the supply tank through pipe 22. Thus the pressure on piston 16 is increased proportionately to the amount the handle is rocked around its pin 57 and thereby a more rapid movement of the turret is obtained. Also a greater air pressure may be provided when the tool engages the work by a further rocking of the handle 5 around its pivot 57.

When the tool has passed sufficiently into the work return of the handle to the position of Fig. 1 will stop its forward movement and if the nature of the work is such that the tool passes completely through it then the construction of Fig. 7 prevents shock of the tool on the work carrier. This is accomplished by the valve 103 which permits air to pass slowly through passage 102, but any sudden increase of pressure in the part of cylinder 2 at the left of piston 16 will cause valve 103 to seat and thereby furnish an effective air cushion to prevent the rapid movement of piston 16.

A movement of the handle 5 toward the right in Fig. 1 reverses the valve connections in Fig. 9 and permits air to pass through the pipe 7 to the left hand end of cylinder 2. As no air passes then through tube 77 the lock 12 is released and the turret 20 may be automatically rotated on its return stroke as is usual.

In the return movement of the turret its speed may be controlled by rocking the handle 5 toward the right in Fig. 5 and thereby increasing the air pressure under the control of diaphragm 37.

The two movements of handle 5, namely, its rocking around pivot 57 and its movement to the right or left in Fig. 1 whereby to rotate plug 55 may be given separately or simultaneously and it is evident that the entire operation of the device may be controlled by one hand of the operator by grasping the lever 5 and moving it in one or both of the directions just indicated. If the device is employed without the pressure regulator then the moving outward and inward of the lever is eliminated and its movement is only to the right or left so as to rotate the valve 55.

Having thus fully described my invention, what I claim as new and desire to secure by Letters Patent, is:

1. The above described method of pneumatic control, by delivering air under pressure to the machine tool, by directing such air from the supply in a predetermined direction, by applying the same to a moving part of said machine, by locking another part of said machine to the first-mentioned part during said movement of the first-mentioned part.

2. The above described method of pneumatic control, by delivering air under pressure to a machine tool, by directing such air from the supply in a predetermined direction, by applying the same to a moving part of said machine to move it in one direction, by directing such air from the supply in another predetermined direction, by applying the same to a moving part of the machine to move it in such second direction, by locking another portion of said machine tool to the first mentioned portion, and by later unlocking the second mentioned portion from the first mentioned portion.

3. The above described method of pneumatic control, by delivering air under pressure to a machine tool, by directing such air from the supply in a predetermined direction, by applying the same to a moving part of said machine to move it in one direction, by directing such air from the supply in another predetermined direction, by applying the same to a moving part of the machine to move it in such second direction, by locking another portion of said machine tool to the first-mentioned portion, by later unlocking the second-mentioned portion from the first-mentioned portion, and by permitting the second-mentioned portion to partially revolve, presenting a new tool to the work.

4. The above described method of pneumatic control, by delivering air under pressure to a machine tool, by regulating the pressure for delivery to a moving part of the machine tool as compared with the pressure in the supply, by directing such air from the supply, so regulated, in a predetermined direction, by applying the same to a moving part of said machine tool to move in one direction, by directing such air from the supply so regulated in another predetermined direction, by applying the same in said moving part to move it in another direction.

5. The above described method of pneumatic control, by delivering air under pressure to a machine tool, by regulating the air pressure for delivery to a moving part of the machine tool as compared with the air pressure in the supply, by directing such air from the supply, so regulated, in a predetermined direction, by applying the same to a moving part of said machine tool to move it in one direction, by directing such air from the supply, so regulated, in another predetermined direction, by applying the same to said moving part to move it in another direction and by utilizing air under pressure to actuate a lock by which another machine tool part is locked to the first portion and held in working position.

6. The above described method of pneumatic control, by delivering air under pressure to a machine tool, by regulating the air pressure for delivery to a moving part of the machine tool as compared with the air pressure in the supply, by directing such air from the supply, so regulated, in a predetermined direction, by applying the same to a moving part of said machine tool to move it in one direction, by directing such air from the supply, so regulated, in another predetermined direction, by applying the same to said moving part to move it in another direction, by utilizing the air under pressure to actuate a lock by which another machine tool part is locked to the first portion and held in working position, by releasing the air from the lock to unlock the two parts of the machine tool.

7. The above described method of pneumatic control, by delivering air under pressure to a machine tool, by regulating the air pressure for delivery to a moving part of the machine tool as compared with the air pressure in the supply, by directing such air from the supply, so regulated, in a predetermined direction, by applying the same to a moving part of said machine tool to move it in one direction, by directing such air from the supply, so regulated, in another predetermined direction, by applying the same to said moving part to move it in another direction, by utilizing the air under pressure to actuate a lock by which another machine tool part is locked to the first portion and held in working position, by releasing the air from the lock to unlock the two parts of the machine tool to permit the chuck to partially revolve to present a new tool to the work upon its being so unlocked.

8. The method of pneumatic control which consists in supplying a gas under pressure to a machine tool, regulating the pressure of the gas delivered to a moving part of the machine tool, supplying the gas so regulated to opposite sides of said moving part of the tool, and in providing a single device to control the extent of regulation of the gas pressure and to determine which side of the moving part shall have the gas applied to it.

In testimony whereof, I affix my signature.

WALTER G. HAAS.